US006209804B1

United States Patent
Spriegel

(10) Patent No.: US 6,209,804 B1
(45) Date of Patent: Apr. 3, 2001

(54) BULKHEAD FITTING FOR A TANK SPRAYER HAVING A NON-ROTATABLE HOSE ADAPTER

(75) Inventor: Clark F. Spriegel, Attica, NY (US)

(73) Assignee: Chapin Manufacturing, Inc.

( * ) Notice: Subject to any disclaimer, the term of this patent is extended or adjusted under 35 U.S.C. 154(b) by 0 days.

(21) Appl. No.: 09/476,572

(22) Filed: Jan. 3, 2000

(51) Int. Cl.⁷ .................................................. A61M 11/02
(52) U.S. Cl. ......................... 239/373; 239/588; 285/246
(58) Field of Search ................................... 239/373, 588; 285/246, 247, 330

(56) References Cited

U.S. PATENT DOCUMENTS

| 787,529 | 4/1905 | Muehtberg . | |
|---|---|---|---|
| 1,160,944 | 11/1915 | Muller . | |
| 1,181,280 | 5/1916 | Winter . | |
| 3,623,753 | * 11/1971 | Henry | 285/330 |
| 4,192,464 | 3/1980 | Chow . | |
| 4,736,969 | * 4/1988 | Fouts | 285/247 |
| 5,178,423 | 1/1993 | Combeau . | |
| 5,307,995 | * 5/1994 | Jackson et al. | 239/373 |
| 5,605,359 | 2/1997 | Hoff . | |
| 5,622,393 | * 4/1997 | Elbich et al. | 285/247 |
| 5,879,033 | * 3/1999 | Hansel et al. | 285/247 |

* cited by examiner

Primary Examiner—Patrick Brinson
Assistant Examiner—Dinh Q. Nguyen
(74) Attorney, Agent, or Firm—Jaeckle Fleischmann & Mugel, LLP

(57) ABSTRACT

A bulkhead fitting for a tank sprayer includes a tank boss and an intermediate hose-receiving adapter, each having respectively a male or female longitudinally-oriented latching portion such that when the adapter is inserted into the boss, the latching portions come together to prevent relative rotation between the boss and the adapter. The female latching portion comprises a longitudinal groove in the outer surface of either the boss or the adaptor. The male latching portion comprises a longitudinal tab extending from an outer portion of either the boss or adapter and is matable with the corresponding female latching portion. In a currently preferred embodiment, two grooves are disposed 180° apart in the outer end of the boss and two tabs are disposed 180° apart on a flange of the barbed adapter. The invention is useful in preventing inadvertent unscrewing of a bulkhead fitting by torsional forces on the hose.

8 Claims, 4 Drawing Sheets

BULKHEAD FITTING FOR A TANK SPRAYER HAVING A NON-ROTATABLE HOSE ADAPTER

Description

The present invention relates to apparatus for removably and sealably connecting a flexible hose to an inlet or outlet port in the wall of a vessel, more particularly, to a bulkhead fitting including a barbed adapter for receiving the end portion of a flexible hose thereupon for detachably retaining the hose in the fitting; and most particularly, to a barbed hose adapter, insertable into a tank inlet or outlet boss, for receiving a flexible hose thereupon and having male or female latching means for cooperating with female or male latching means on the boss to prevent rotation of the adapter in the boss during and after tightening of a compression nut on the boss for retaining the hose on the adapter. The present invention is useful, for example, in removably attaching a sprayer hose to the tank of a garden sprayer.

It is known to use a bulkhead fitting comprising a compression nut for attaching a flexible, semi-elastic hose to the inlet or outlet of a vessel. Typically, a vessel port is provided with a male-threaded boss extending outwards from the wall of the vessel. The boss may be further formed to have a male portion having an axial passage there through and extending outwards from the boss for receiving in female relationship the end of the flexible hose. A female-threaded compression nut is screwed onto the boss to compressibly capture the end of the hose onto the male portion. See, for example, U.S. Pat. No. 5,178,423 issued Jan. 12, 1993 to Combeau.

Alternatively, for ease and economy of manufacture, in place of the integral male extension of the boss, a separate intermediate hose-receivable adapter having an axial passage there through and having one or more saw-tooth annular expansions ("barbs") or ridges on its outer surface may be provided and sealably disposed within the boss. See U.S. Pat. No. 5,307,995 issued May 3, 1994 to Jackson et al. wherein the end of the hose is urged into the boss by a compression nut and is clamped to the mouth of the boss by an inwardly facing surface of an intermediate hose adapter.

A problem can occur with some bulkhead fittings having separate intermediate hose adapters. During use of the coupled hose and vessel, for example, as in a conventional garden tank sprayer, torsional forces may be exerted on the hose. Because the hose is captured by the nut in a frictional and compressional fit between the adapter and the boss, such forces have been known to cause the nut, hose, and adapter to become unscrewed as a unit from the boss, resulting in undesirable leakage and loss of pressure from the tank. Such leakage can be messy, leading to customer dissatisfaction with the device, and can also be hazardous to the operator.

What is needed is a system for removably attaching a flexible hose to a tank boss via an intermediate hose adapter wherein the adapter is prevented from rotating within the boss during and after tightening of a compression nut.

It is a principal object of the invention to provide a system for attaching a hose to a tank wherein torsional forces on the hose are prevented from causing unscrewing of the compression nut.

It is a further object of the invention to provide a system for attaching a hose to a tank wherein the hose may be readily installed onto and removed from the tank.

Briefly described, a bulkhead fitting embodying the invention includes a tank boss and an intermediate hose-receiving adapter, each having respectively a male or female longitudinally-oriented latching portion such that when the adapter is inserted into the boss, the latching portions come together to prevent relative rotation between the boss and the adapter. The female latching portion may comprise a longitudinal groove in the outer surface of either the boss or the adapter, and the male latching portion may comprise a longitudinal tab extending from an outer portion of either the boss or adapter and matable with the corresponding female latching portion. In a currently preferred embodiment, two grooves are disposed 180° apart in the outer end of the boss and two tabs are disposed 180° apart on a flange of the barbed adapter.

The foregoing and other objects, features, and advantages of the invention, as well as presently preferred embodiments thereof, will become more apparent from a reading of the following description in connection with the accompanying drawings in which.

Figure 1:
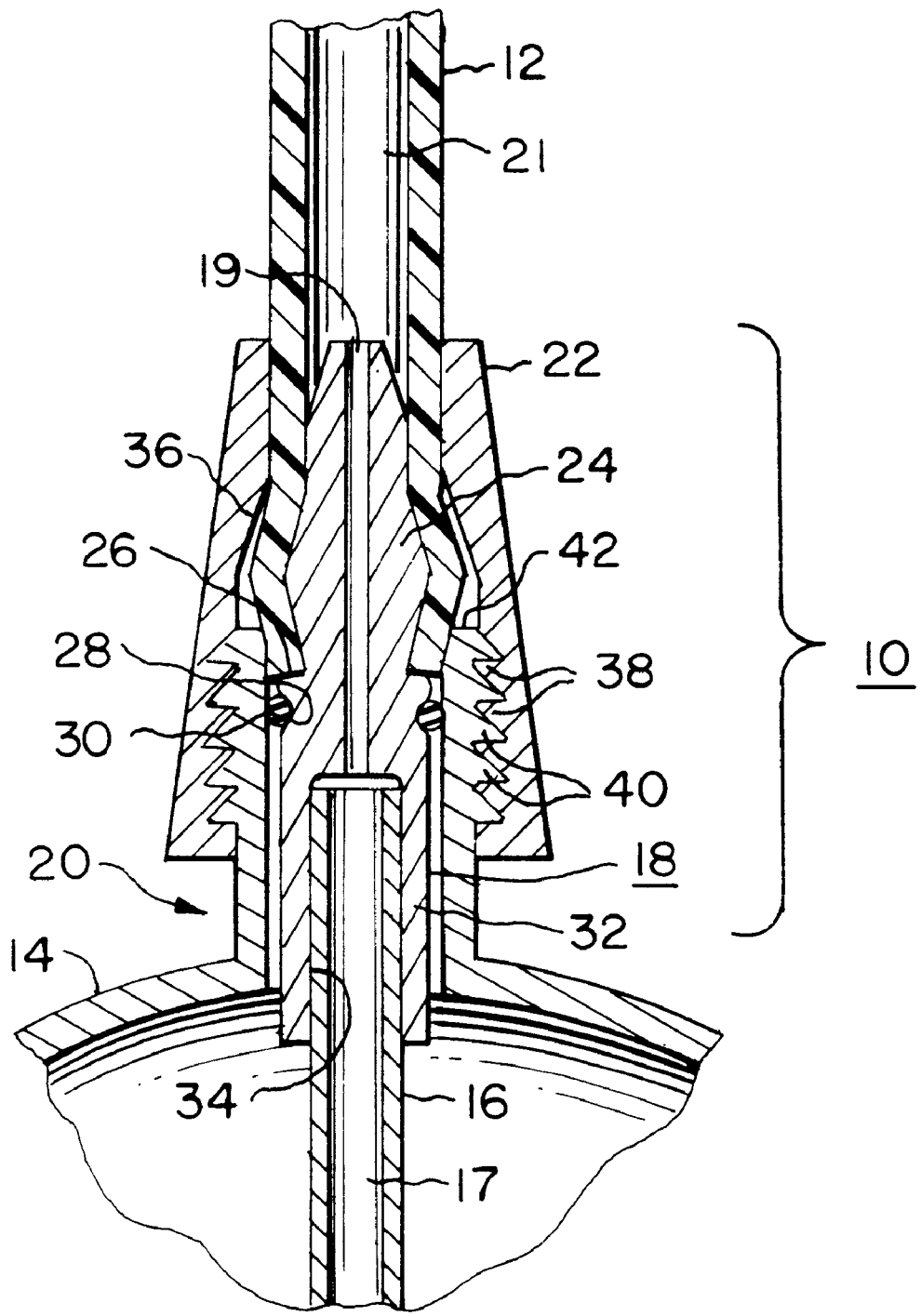
FIG. 1 is a cross-sectional view of a prior art hose attachment system.

Referring to FIG. 1, a prior art bulkhead compression fitting 10 for removably attaching a flexible dispensing hose 12 to a tank 14 includes a feed tube 16 running into tank 14 and coupled to hose 12 by an adapter 18 which is held in an outwardly-projecting threaded boss 20 by a compression nut 22. Boss 20 is mounted on a shoulder of tank 14 as by adhesion or welding or molded as part of the tank.

Hose 12 is forced over adapter 18 having a raised annular shoulder 24 such that the hose bulges around and adopts approximately the same shape as adapter 18. Hose 12 extends to and abuts annular ridge 26 which serves as a hose stop. Immediately below ridge 26 is an annular groove 28 for receiving an elastomeric o-ring 30 for providing a water-tight static seal between adapter 18 and boss 20. The lower portion 32 of adapter 18 includes a bore 34 for receiving supply tube 16, which has an inner bore 17 in communication via bore 19 in adapter 18 with flow passage 21 in hose 12.

Compression nut 22 includes an inner annular compression surface 36 and a series of threads 38 for mating with threads 40 on boss 20. As nut 22 is tightened on the threads, the end of hose 12 is forced into the bore of boss 20 and is captured between the mouth 42 of boss 20 and the shoulder portion 24 of adaptor 18.

As noted above, adapter 18 is not constrained from rotation within boss 20 in response to torsional forces on hose 12 relative to tank 14, either during or after tightening of nut 22 on boss 20, except by frictional forces exerted on the boss by o-ring 30 and hose 12. Thus, nut 22, hose 12, and adapter 24 may turn together as a unit and may become inadvertently loosened from boss 20 during use of the apparatus.

Figure 6:
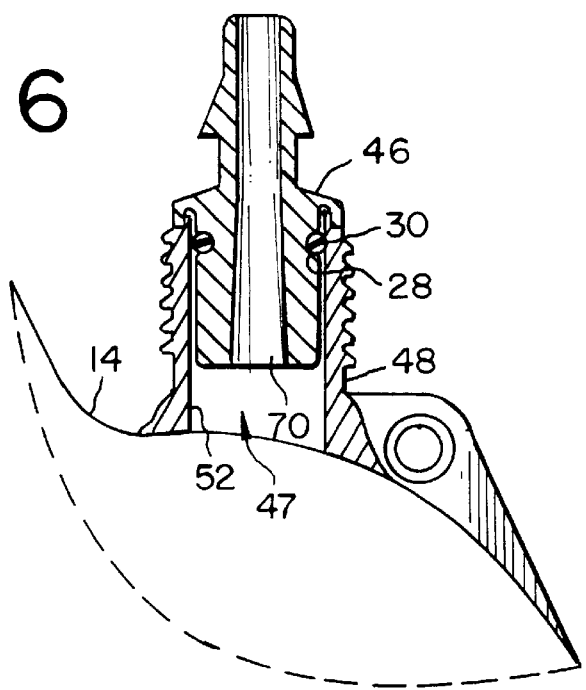
FIG. 6 is a partial assembly view showing the tank boss of FIG. 5 attached to an outlet port of a vessel, and showing further the intermediate hose adapter of FIGS. 2–4 installed non-rotatably in the boss.
Figure 7:
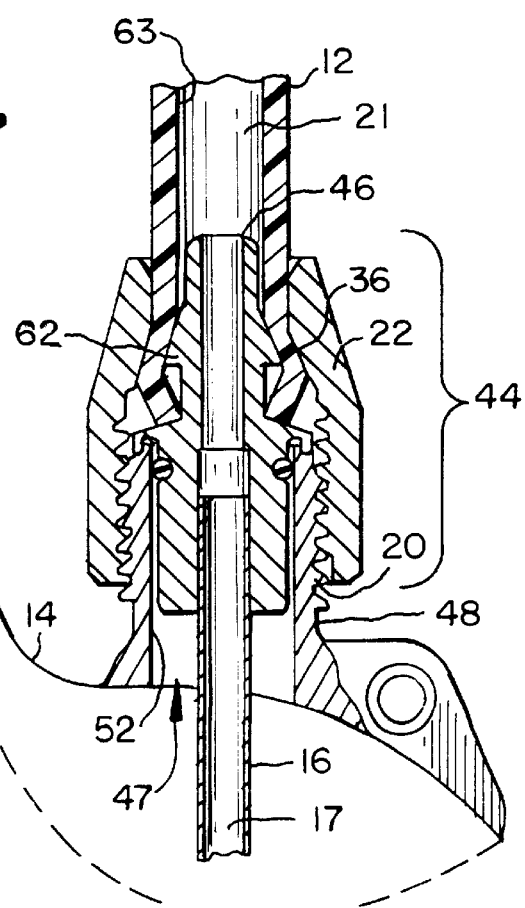
FIG. 7 is a full assembly view showing a hose connected via a compression nut to the partial assembly shown in FIG. 6.

Referring to FIGS. 2 through 9, a bulkhead compression fitting 44 in accordance with the invention includes a generally cylindrical hose adapter 46 disposed in a threaded boss 48 surrounding an outlet port 47 a tank 14. As in prior art fitting 10, hose 12 is forced over an adapter, and a compression nut 22 screwed onto boss 48 binds the fitting together, as shown in FIG. 7.

Adapter 46 includes three distinct sections: an inner section 50 for coaxial entry into the bore 52 of boss 48, including an annular groove 28 for receiving an o-ring 30 for providing a water-tight static seal between adapter 46 and boss 48; a central section 54 including an equatorial flange 56 for limiting ingress of adapter 46 into bore 52, and for limiting the travel of hose 12 onto adapted 46, and for supporting one or more axially-extending longitudinal tabs 58 defining male latching elements, and an outer section 60 including at least one annular hose barb 62 comprising a conical outwardly-facing surface 64 and a substantially planar inwardly-facing axial surface 66 substantially orthogonal to the axis 68 of fitting 44, barb 62 engaging and retaining hose 12 on the inner wall 63 thereof in known fashion when hose 12 is compressed against barb 62 by inner annular compression surface 36 on compression nut 22, as shown in FIG. 7. Adaptor 46 is further provided with a central passageway 70 there through for receiving supply tube 16 and for communicating between the inner bore 17 of tube 16 and flow passage 21 in hose 12.

Figure 2:
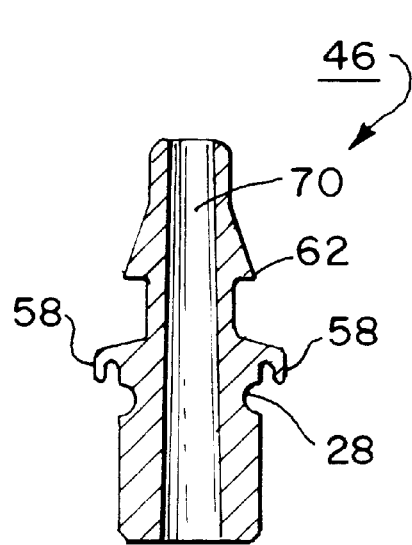
FIG. 2 is a cross-sectional view of a first embodiment of a barbed hose adapter in accordance with the invention, taken along line 2—2 in FIG. 3 and showing male tabs extending from an adapter flange.
Figure 3:
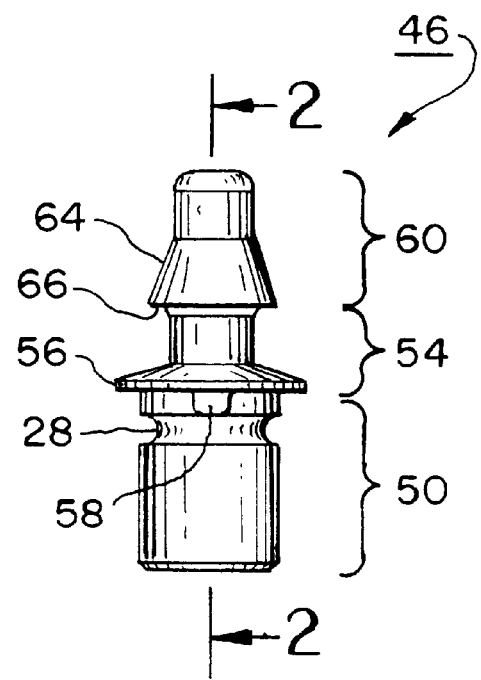
FIG. 3 is an elevational view of the adapter shown in FIG. 2.
Figure 4:
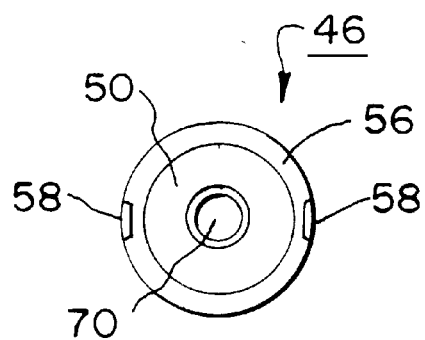
FIG. 4 is a plan view of the inner end of the adapter shown in FIG. 2.
Figure 5:
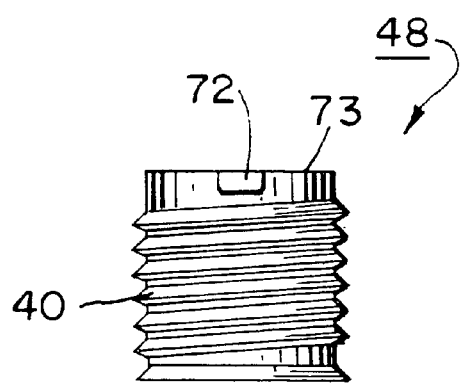
FIG. 5 is an elevational view of a tank boss having female grooves for receiving the male tabs of the adapter shown in FIGS. 2 through 4.

Boss 48 is similar to prior art boss 20, being generally cylindrical and having male threads 20 on the outer surface thereof. Boss 48 is further provided, however, with one or more short, longitudinal grooves 72 formed in the outer surface near the outer end 73 of the boss defining female latching elements for receiving male latching elements 58 during assembly of fitting 44, as shown in FIGS. 6 and 7. Preferably, fitting 44 includes two tabs 58 disposed 180° apart, as shown in FIGS. 2 and 4, and two matching grooves 72 also disposed 180° apart. The insertion of tabs 58 into grooves 72 rotationally latches adaptor 46 to boss 48 such that no relative rotational motion can occur between the adaptor and the boss. The latching prevents the nut, hose, and adaptor from turning as a unit, as may happen with prior art fitting 10.

Figure 8:
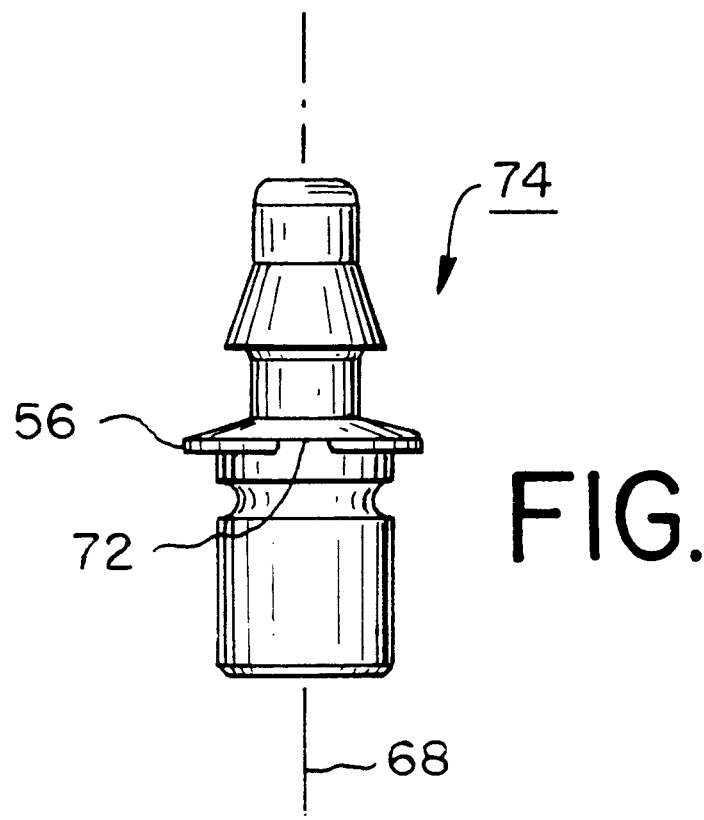
FIG. 8 is an elevational view of a second embodiment of a barbed hose adapter in accordance with the invention, showing female grooves extending through an adapter flange for receiving the male tabs of the boss shown in FIG. 9.
Figure 9:
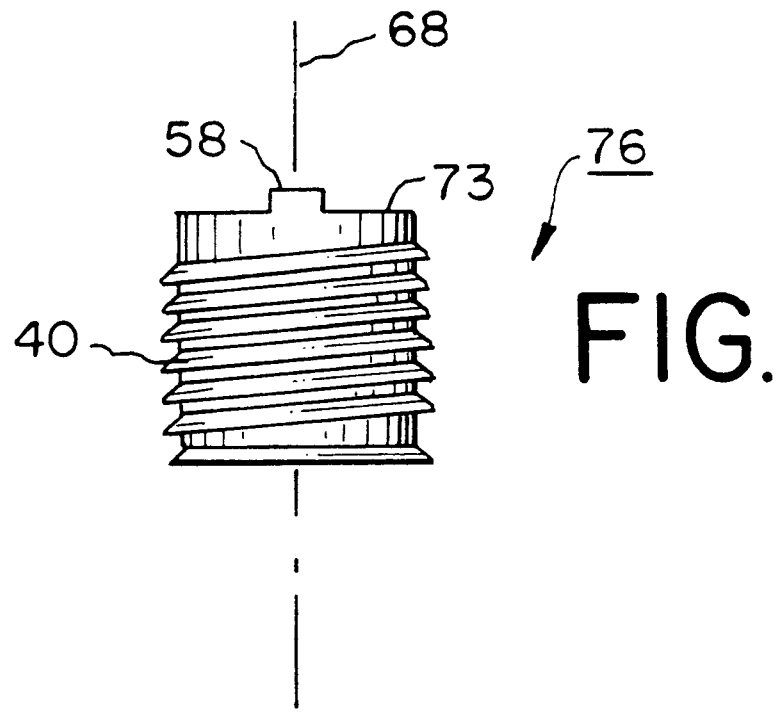
FIG. 9 is an elevational view of a tank boss having male tabs extending from the outer end of the boss.

Referring to FIGS. 8 and 9, second embodiments of a hose adapter 74 and boss 76 in accordance with the invention are shown, wherein male tabs 58 are provided on the boss and female grooves 72 are provided in the flange 56 of the adapter.

From the foregoing description, it will be apparent that there has been provided an improved bulkhead compression fitting wherein mating male and female latching elements on the tank boss and the hose adapter prevent relative rotation there between, thereby preventing torsional forces on the hose from causing the compression nut of the bulkhead fitting to become unscrewed. Variations and modifications of the herein described bulkhead fitting, in accordance with the invention, will undoubtedly suggest themselves to those skilled in this art. Accordingly, the foregoing description should be taken as illustrative and not in a limiting sense.

What is claimed is:

1. A tank sprayer with a bulkhead fitting at an outlet port of said tank for removably attaching a flexible hose to the tank, said fitting comprising:

a) a boss surrounding said outlet port and having an axial bore therethrough and extending outwardly of said tank and being provided with male threads on an outer surface thereof;

b) a hose adaptor disposed in said axial bore in said boss and having a portion extending outwardly of said boss for receiving said hose, said outwardly-extending portion having a tapered annular barb for engaging an inner wall of said hose; and c) a compression nut having an inner surface provided with a tapered portion and with female threads matable with said male threads on said boss and having an axial bore therethrough for compressing said hose between said tapered portion of said inner surface of said nut and said tapered barb on said hose adapter;

said boss and said hose adaptor being provided with corresponding male and female latching elements for preventing relative rotational motion between said boss and said adapter.

2. The tank sprayer with the bulkhead fitting in accordance with claim 1 wherein said female latching elements are disposed on said boss and said male latching elements are disposed on said adapter.

3. The tank sprayer with the bulkhead fitting in accordance with claim 1 wherein said male latching elements are disposed on said boss and said female latching elements are disposed on said adapter.

4. The tank sprayer with the bulkhead fitting in accordance with claim 1 wherein said female latching elements include at least one longitudinal groove disposed in a surface of one of said boss and said adapter.

5. The tank sprayer with the bulkhead fitting in accordance with claim 1 wherein said male latching elements include at least one latching tab extending longitudinally from one of said boss and said adapter.

6. The tank sprayer with the bulkhead fitting in accordance with claim 1 wherein said hose adapter is further provided with an equatorial flange for mating with the outer end of said boss.

7. The tank sprayer with the bulkhead fitting in accordance with claim 6 wherein said latching elements are formed in said equatorial flange.

8. The tank sprayer with the bulkhead fitting in accordance with claim 1 wherein said tank sprayer is provided with means for sealing between said boss and said hose adapter.

* * * * *